(12) United States Patent
Chenowth

(10) Patent No.: US 7,510,230 B2
(45) Date of Patent: Mar. 31, 2009

(54) DUST-PROOF END CLOSURE FOR CONTRACTIBLE CANOPY

(76) Inventor: Lynn Chenowth, 1404 N. Marshall Ave., El Cajon, CA (US) 92020

( * ) Notice: Subject to any disclaimer, the term of this patent is extended or adjusted under 35 U.S.C. 154(b) by 0 days.

(21) Appl. No.: 11/758,626

(22) Filed: Jun. 5, 2007

(65) Prior Publication Data
US 2008/0302404 A1 Dec. 11, 2008

(51) Int. Cl.
*B60P 7/02* (2006.01)
(52) U.S. Cl. .................................. 296/100.16
(58) Field of Classification Search ............ 296/100.01, 296/101, 100.06, 100.07, 100.08, 100.1, 296/100.11, 100.12, 100.13, 100.16
See application file for complete search history.

(56) References Cited

U.S. PATENT DOCUMENTS

| 3,820,840 | A | * | 6/1974 | Forsberg ................. 296/100.12 |
| 4,252,363 | A | * | 2/1981 | Rodrigue ................ 296/100.12 |
| 4,285,539 | A | * | 8/1981 | Cole .......................... 296/105 |
| 4,740,029 | A | | 4/1988 | Tuerk |
| 4,948,193 | A | | 8/1990 | Weaver |
| 5,112,097 | A | | 5/1992 | Turner, Jr. |
| 5,524,953 | A | | 6/1996 | Shaer |
| 5,938,270 | A | * | 8/1999 | Swanson et al. ........ 296/100.11 |
| 6,007,138 | A | | 12/1999 | Cramaro |
| 6,142,554 | A | * | 11/2000 | Carroll et al. .......... 296/100.12 |
| 2005/0151390 | A1 | * | 7/2005 | Schmeichel et al. .... 296/100.16 |

FOREIGN PATENT DOCUMENTS

| JP | 19118745 | 5/2007 |
| KR | 1019970000841 | 1/1997 |
| KR | 100709482 | 4/2007 |

OTHER PUBLICATIONS

PCT Search Report and Written Opinion from corresponding Application No. PCT/US2008/007075.

* cited by examiner

*Primary Examiner*—H Gutman
(74) *Attorney, Agent, or Firm*—Charmasson, Buchaca & Leach, LLP

(57) ABSTRACT

A foldable canopy cover can be automatically extended over the open top of a container. The canopy is supported by a series of arcuate booms transversally spanning the top of the container. Each boom is secured at opposite ends to a pair of train members riding on rails running along the lateral upper edges of the container. At the end of the covering movement, as the leading edge of the canopy approaches the end of the container, it is brought down flush with the container rim by contact between a cam ramp associated with the container and a roller pin on a lever supporting the leading edge of the canopy, in order to tightly close the open top.

9 Claims, 3 Drawing Sheets

US 7,510,230 B2

DUST-PROOF END CLOSURE FOR CONTRACTIBLE CANOPY

FIELD OF THE INVENTION

This invention relates to contractible canopies for truck beds, and more particularly to mechanisms for providing a tight closure of the canopy at the end of its deployment movement.

BACKGROUND

In many jurisdictions, the law requires that trucks and trailers used in the transport of various materials such as sand, gravel, grain, trash and other loose substances have a cargo area fully covered by a tarpaulin sheet or a net in order to prevent transported material from being blown away and causing driving hazards for following vehicles or from dumping litter on the highway.

Contractible canopies are usually rolled up or bundled up when not in use against the forward edge of a cargo area, then deployed on command until the leading edge of the canopy meets the trailing edge of the cargo compartment.

Because the framework holding the tarpaulin tends to ride a few centimeters above the top edges of the container, a gap may be left between the leading edge of the tarpaulin and the back of the cargo area. This gap can allow material to pass through and be dumped on the highway. The problem has been addressed in the prior art with rather complex and bulky mechanisms as disclosed in U.S. Pat. No. 4,740,029 Tuerk; No. 5,524,953 Shaer; and No. 6,007,138 Cramaro. These three patents are hereby incorporated herein by this reference into this specification. The multiplicity of levers, pulleys, push-rods, and articulations in the embodiments of the prior art increase the chances of failure and require frequent maintenance, especially if the vehicle, as is often the case, operates in a very dusty environment.

The instant invention results from an attempt to provide a simple, foolproof and dust-proof closure at the back edge of a contractible canopy covering a container.

SUMMARY

A contractible canopy assembly for covering the open top of a quadrangular container comprises first and second rails parallelly installed along opposite sides of the open top, a plurality of train members slidingly mounted on each of said rails and being translatable therealong, including a leading pair of said train members movable toward a distal edge of the container, a plurality of booms spanning said top, each being secured at opposite ends of one of said train members, a pair of levers, each having a fulcrum point in a median section thereof and being rotatively attached about said fulcrum point to one of the leading train member about an horizontal axis, a leading one of said booms joining first locations on the levers, and means for rotating the levers and leading boom as said leading train members approach an extremity of the rails.

The means for rotating include a cam-ramp proximal to the extremity of a rail and a roller pin at a second location on at least one of the levers. The cam-ramp is sized and contoured to interact with the roller pins and to rotate the lever.

The ramp is preferably secured to a face of one of the rails.

The above assembly further comprises a pair of axles, each projecting horizontally from one of the rails and engaging one of the levers at its fulcrum point.

The means for rotating further comprise means for resiliently biasing the levers toward an upright position.

In the aforesaid assembly, the means for biasing comprise a spiral spring having an inner end fixedly attached on said axle and an outer end secured to the lever.

The cam-ramp comprises a median section obliquely oriented in relation to the rail and a distant section parallel to the rails.

The assembly further comprises a mortise-forming block at the distal edge of the container and a bolt associated with the leading train member and lever, and being positioned to engage the mortise-forming member when the roller pin contacts the distal section of the cam-ramp.

The assembly further comprises means for adjusting the tension of said spring.

The means for adjusting comprise a plurality of locations for securing outer end of the spring to the lever.

DESCRIPTION OF THE EXEMPLARY EMBODIMENT

Figure 1:
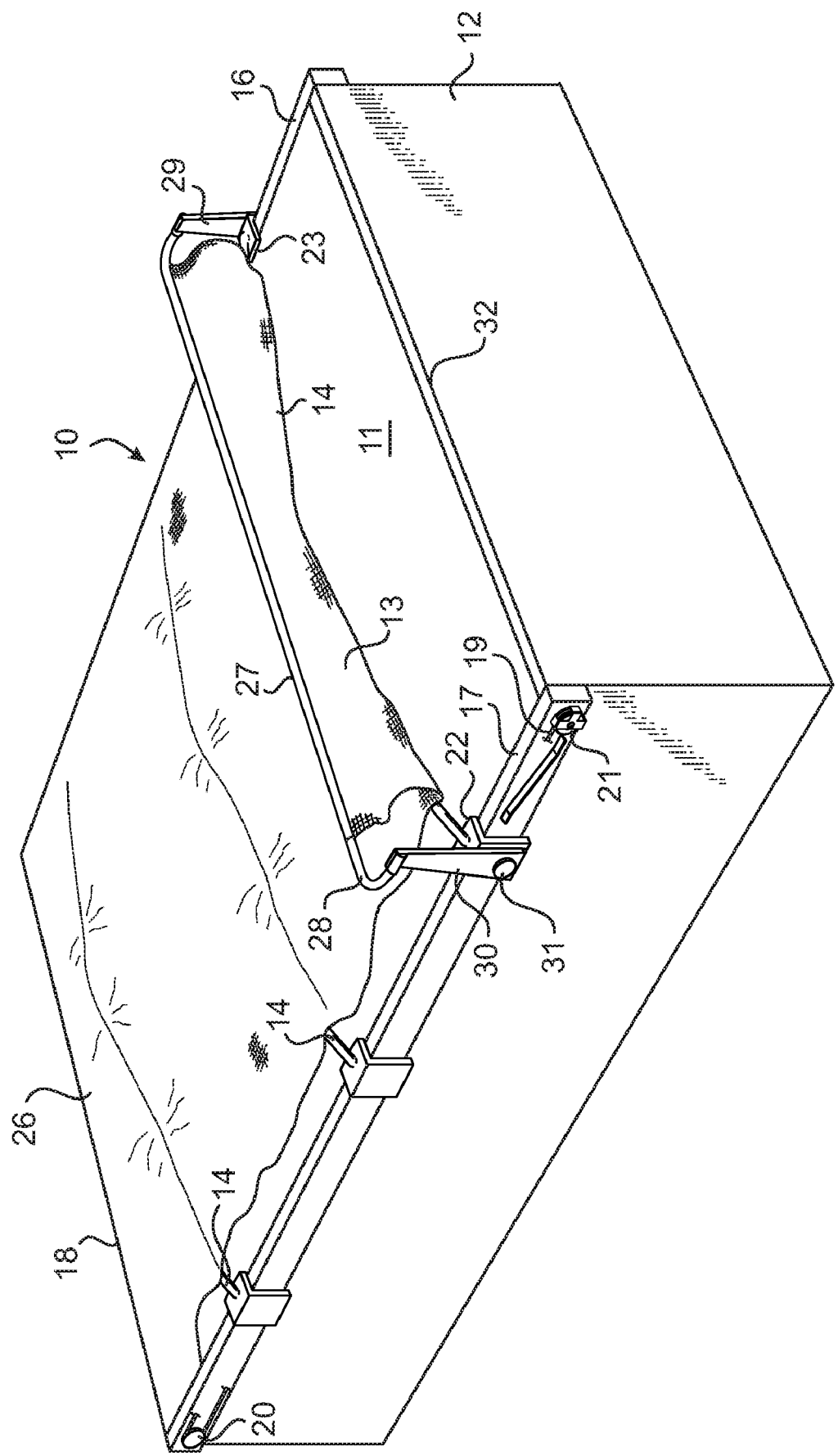
FIG. 1 is a perspective view of a contractible canopy according to the invention.

Referring now to the drawing, there is shown in FIG. 1, a contractible canopy 10 according to the invention being deployed over the open top 11 of a container 12. It should be understood that the container could constitute the cargo area of a truck, trailer or other vehicle.

The canopy comprises a tarpaulin 13 supported by a series of arcuate booms 14 spanning the open top transversally. Each boom is supported at opposite ends by a pair of train members 15 slidingly mounted on a pair of rails 16, 17 so that the train members and associated booms can be translated back and forth along the rails.

In its contracted state, the canopy is bunched up against one of the extremities 18 of the container 12. If the container constitutes the cargo area of a truck or trailer, that extremity 18 would preferably be the forward part of the container.

A cable 19 on each side of the assembly runs between two pulleys 20, 21 and is captured by the leading train members 22, 23; that is the most rearward located in the case of a truck container. It should be understood that the cable and pulleys could be equivalently replaced by a chain and gear assembly as disclosed in U.S. Pat. No. 5,112,097 Turner, Jr., which patent is hereby incorporated herein by this reference into this specification. The pulleys are synchronously driven in either direction by a motor in a manner disclosed in the prior art. The rails 16, 17 are parallelly installed against the lateral upper edges 24, 25 of the container or otherwise formed onto the container such as by being formed integrally with the lateral edges themselves. The back edge 26 of the tarpaulin is preferably permanently attached to the forward extremity 18 of the container. The leading edge 27 is attached to a leading boom 28. That boom is secured at opposite ends to a pair of levers 29, 30. Each lever is rotatively connected at a fulcrum point 31 to one of the leading train members 22, 23 about an horizontal axis.

Figure 2:
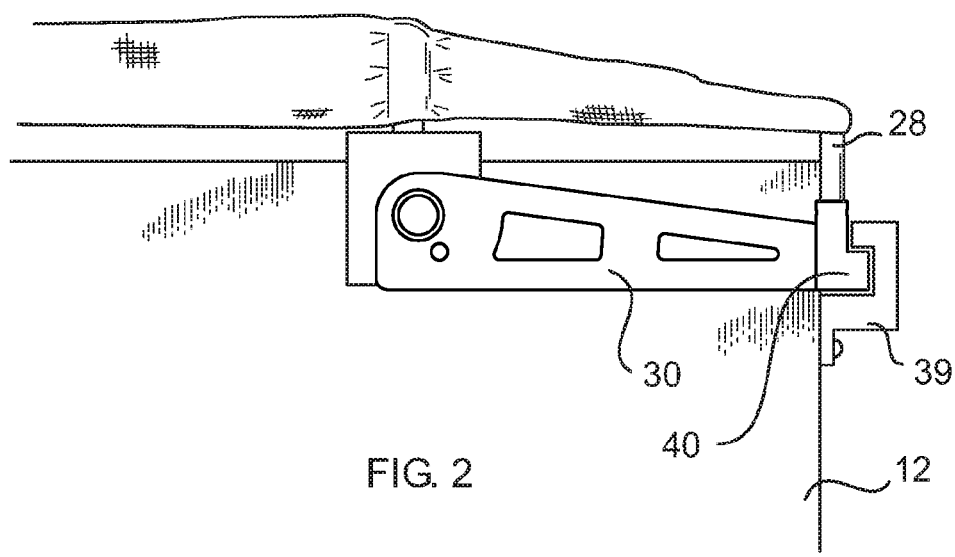
FIG. 2 is a diagrammatical side view of the closed end of said canopy.
Figure 4:
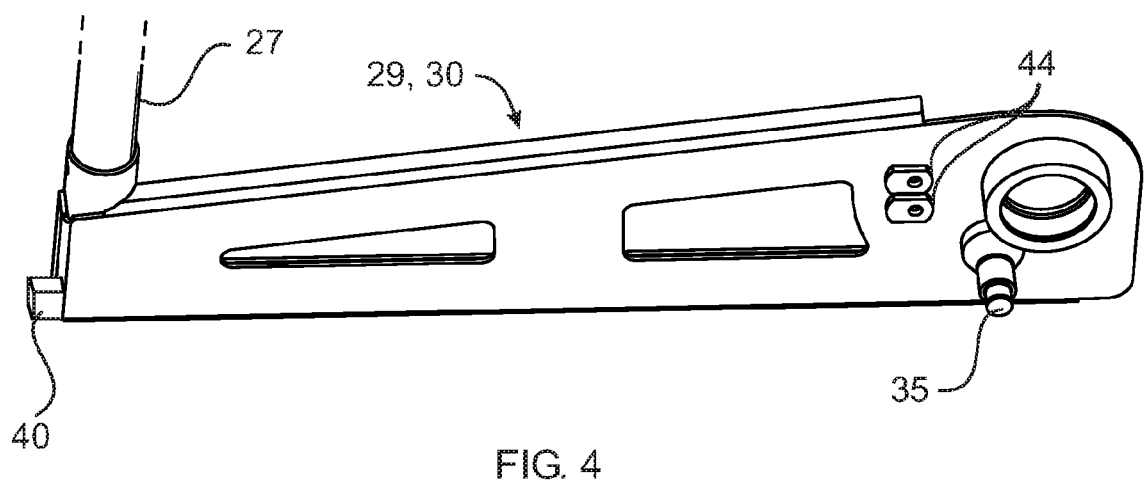
FIG. 4 is a perspective view of the end closure lever.
Figure 3:
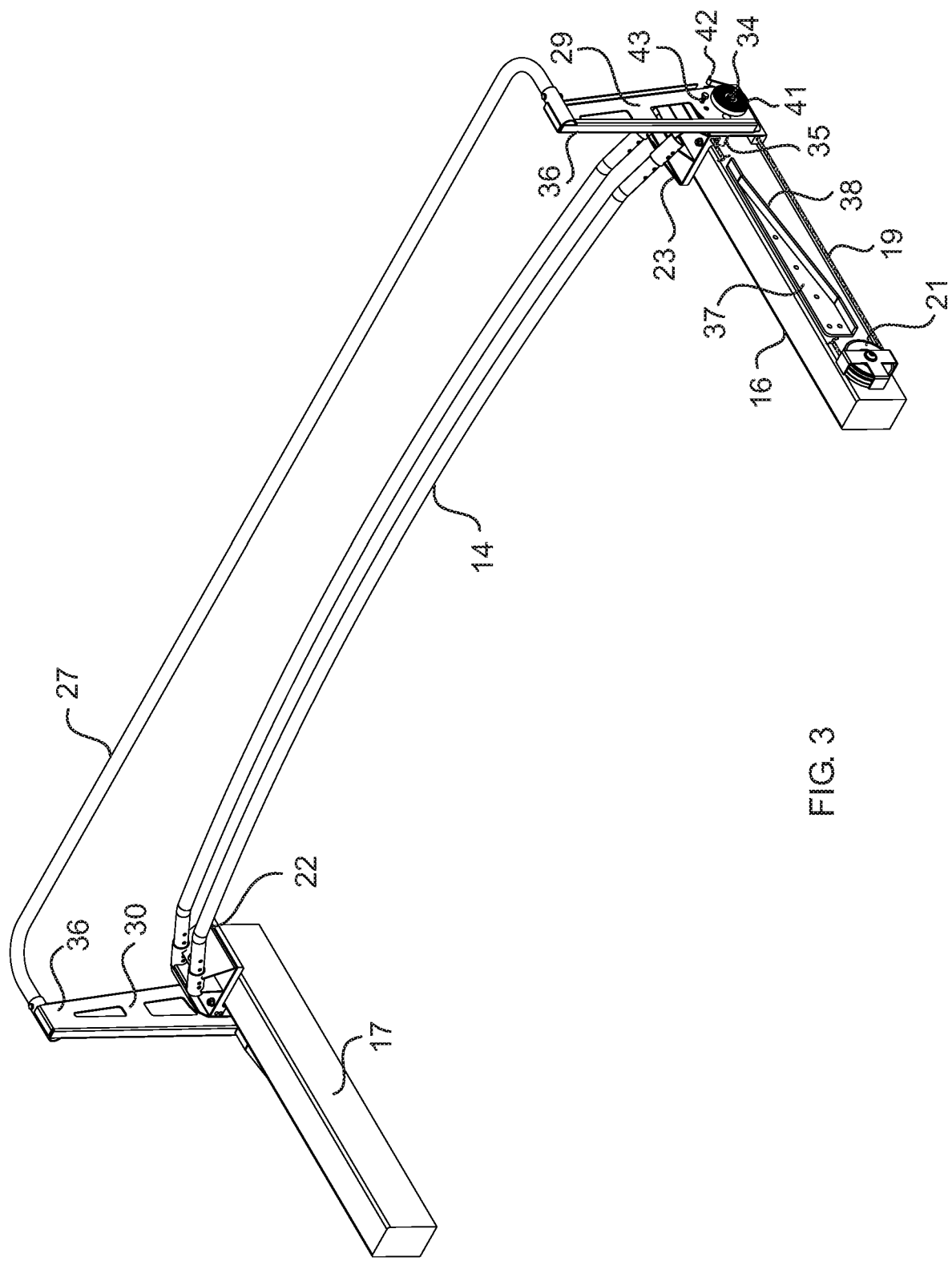
FIG. 3 is a perspective view of the end closure mechanism.

As the trailing train members approach the back upper edge 32 at the extremity of the container near the end of the canopy deployment procedure, the levers 29, 30 are rotated about 90 degrees to bring the leading edge 27 of the canopy and leading boom 28 into intimate contact with the back edge 32 of the container as illustrated in FIG. 2. The shape and dimensions of the leading boom 28 are designed to matingly match the outline of the back upper edge 32 of the container. The rotating movement of the lever is imposed by a roller pin and cam mechanism as further described below.

Each lever 29, 30 is rotatively mounted to its corresponding train member, at its fulcrum point, on an axle 34 projecting horizontally from the outer face of the corresponding rail 16, 17. A roller pin 35 projects from the inner face 36 of the lever and, as the leading train members 22,23 and levers approach the end of the rails and the extremity of the container, comes into contact with a cam-ramp 37. The cam-ramp has a median section 38 which is oblique in relation to the orientation of the rails, that is slopping downward toward the extremity of the container, and a distal section 39 which runs parallel to the rails. As the roller pin 35 comes in contact with the under surface of the oblique section 38 of the cam-ramp, it is guided downward and the levers are forced into rotation until they reach the closed position illustrated in FIG. 2.

As further illustrated in FIG. 2, a mortise-forming member 39 is mounted at the extremity of the container 12 and is engaged by a bolt 40 formed near the junction of the lever and leading boom 27.

In order to keep the levers upright during the canopy deployment procedure, a spiral spring 41 having its inner end fixedly attached to the axle 34 and its outer end 42 secured to a screw pin 43, biases the lever toward that position. A plurality of threaded bores 44 are provided to mount the screw pin 43 at different radial positions in relation to the axle 34 in order to provide a convenient means to adjust the tension of the spring by changing the position of the screw pin 42.

The movement of the bolt 40 into the mortise-forming member 39 is guided by the distal section 45 of the cam-ramp which is parallel to the rails.

While the preferred embodiment of the invention has been described, modifications can be made and other embodiments may be devised without departing from the spirit of the invention and the scope of the appended claims.

The invention claimed is:

1. A contractible canopy assembly for covering the open top of a quadrangular container which comprises:
   first and second rails parallelly formed along opposite sides of said open top;
   a plurality of train members slidingly mounted on each of said rails and being translatable therealong, including a leading pair of said train members movable toward a distant edge of said container;
   a plurality of booms spanning said top, each being secured at opposite ends to one of said train members;
   a pair of levers, each having a fulcrum point in a first location thereof and being rotatively attached at said fulcrum point to one of said leading pair of said train members about an horizontal axis;
   a leading one of said booms joining top first ends of said levers;
   a tarpaulin attached at spaced-apart intervals to said booms;
   means for pulling said leading pair of said train members back and forth along said rails; and
   means for rotating said levers and leading boom as said leading pair of said train members approach an extremity of said rails;
   wherein said means for rotating comprises a cam ramp proximal to said extremity; and
   a roller pin at a second location of at least one of said levers, said cam ramp being sized and contoured to interact with said roller pin and to rotate said at least one of said levers.

2. The assembly of claim 1, wherein said ramp is secured to a face of one of said rails.

3. The assembly of claim 2, which further comprises a pair of axles, each projecting horizontally from one of said leading pair and engaging one of said levers at said fulcrum point.

4. The assembly of claim 1, wherein said means for rotating further comprise means for resiliently biasing said levers toward and upright position.

5. The assembly of claim 4, which further comprises a pair of axles, each projecting horizontally from one of said leading pair and engaging one of said levers at said fulcrum point; and,
   wherein said means for biasing comprises a spiral spring having an inner end fixedly attached on said axle and an outer end secured to said lever.

6. The assembly of claim 5 which further comprises means for adjusting the tension of said spring.

7. The assembly of claim 6, wherein said means for adjusting comprise a plurality of locations for securing said outer end of said spring to said lever.

8. The assembly of claim 4, wherein said cam ramp comprises a median section obliquely oriented in relation to said rail and a distant section parallel to said rail.

9. The assembly of claim 8 which further comprises a mortise-forming member at said distant edge; and
   a bolt associated with one of said leading pair of said train members and lever, and being positioned to engage said mortise-forming member when said roller pin reaches said distant section.

* * * * *